United States Patent [19]

Daniels et al.

[11] 3,845,325

[45] Oct. 29, 1974

[54] IGFET FLIP-FLOP HAVING FACILITY FOR FORCING ITS STATE

[75] Inventors: Richard Gary Daniels, Tempe; James Walter Foltz, Scottsdale, both of Ariz.

[73] Assignee: Motorola, Inc., Franklin Park, Ill.

[22] Filed: Apr. 23, 1973

[21] Appl. No.: 353,831

[52] U.S. Cl. ............ 307/220 C, 307/205, 307/215, 307/218, 307/225 C, 307/279, 307/304

[51] Int. Cl. ........................ H03k 21/00, H03k 3/26

[58] Field of Search ........ 307/205, 215, 218, 220 C, 307/225 C, 279, 304

[56] References Cited

UNITED STATES PATENTS

| | | | |
|---|---|---|---|
| 3,493,785 | 2/1970 | Rapp | 307/279 |
| 3,679,913 | 7/1972 | Foltz | 307/279 |
| 3,753,009 | 8/1973 | Clapper | 307/279 |

*Primary Examiner*—Stanley D. Miller, Jr.

*Attorney, Agent, or Firm*—Vincent J. Rauner; Kenneth R. Stevens

[57] ABSTRACT

A bi-stable flip-flop circuit utilizing insulated gate field effect transistors in a plurality of logic circuits connected to receive a bi-level signal and the inverse thereof on two inputs and to supply an output signal and the inverse thereof on two outputs, the outputs being of a frequency of one-half of the frequency of the input signals. The output signal and the inverse thereof can be forced to a predetermined binary value and the inverse thereof by the application of a state-forcing signal, irrespective of the input signals.

17 Claims, 6 Drawing Figures

IGFET FLIP-FLOP HAVING FACILITY FOR FORCING ITS STATE

BACKGROUND OF THE INVENTION

1. Field of the Invention

The present invention relates to binary flip-flops of the type formed from insulated gate field effect transistors. More specifically, the IGFET flip-flop of this invention has facility, in addition to a bi-level input signal and the inverse thereof, for changing its binary state in response to a state-forcing signal.

2. Description of the Prior Art

IGFET binary flip-flops are known, particularly with reference to that type of flip-flop that employs a first AND-NOR-inverter circuit and a second AND-NOR-inverter circuit with appropriate interconnections to form a master-slave flip-flop. This type of flip-flop is the subject of U. S. Pat. No. 3,679,913, patented July 25, 1972 and assigned to the assignee of this invention.

Flip-flops made of bi-polar transistors have typically been provided with a facility for force setting or resetting. That is to say, by application of a state-forcing signal, the flip-flop can be set to the "1" state if desired, or reset to the "0" state if desired. This facility has generally not been available in the IGFET flip-flop of the master-slave type mentioned above. A known exception is a resettable binary flip-flop comprised of IGFETs which is the subject of U.S. Pat. No. 3,753,009, issued Aug. 14, 1973, assigned to the assignee of this invention. This co-pending case has the facility for causing the flip-flop to assume a "0" state but accomplishes this facility in a manner quite different from that of this application.

SUMMARY OF THE INVENTION

This invention provides a known IGFET flip-flop with a facility for forcing the state of the flip-flop, depending upon the binary state of an input state-forcing signal. The state-forcing signal is applied to a pair of output gates, each gate also having as a second input an output from an AND-NOR circuit, the AND-NOR circuits each being a part of a master and slave section, respectively, of the flip-flop. The outputs of the gates serve as inputs to the flip-flop and the output of the slave section serves as an output of the flip-flop. The gate circuits take the form of logical NOR circuits when the flip-flop is to be forced to the "0" state and take the form of NAND logical circuits when the flip-flop is to be forced to the "1" state.

IGFET flip-flops may be used as frequency dividing circuits, connected in a cascaded fashion. A typical application is the cascading of IGFET flip-flops as a frequency divider in crystal controlled wristwatches.

It is an object of this invention to provide an IGFET binary flip-flop which can be forced into the "1" or "0" binary state by a state-forcing signal.

It is another object of this invention to provide a facility for forcing the state of a bi-stable IGFET flip-flop using a minimum of components.

These and other objects will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DETAILED DESCRIPTION OF THE INVENTION

Figure 1:
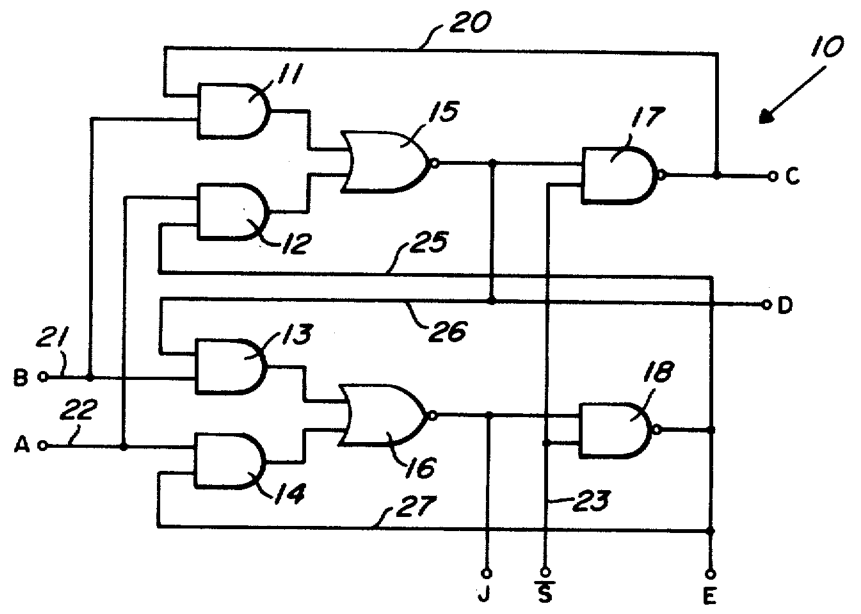
FIG. 1 is a logic diagram for a settable binary flip-flop.

Referring first to FIG. 1, a logic diagram is shown wherein AND circuits 11 and 12 and NOR circuit 15 form a part of the "slave" portion of the complementary IGFET flip-flop 10, and AND circuits 13 and 14 and NOR circuit 16 form a part of the "master" portion. These sections are old in the art and may be studied in great detail in U.S. Pat. No. 3,679,913 mentioned above. Conductor 22 is connected to receive a bi-level input signal A and to conduct that signal to AND circuits 12 and 14 to serve as an input to each. Conductor 21 is connected to receive bi-level input signal B, which is the complement of input signal A, and to conduct signal B to AND circuits 11 and 13 to serve as an input to each.

NAND circuit 17 has the output D of NOR circuit 15 and NAND circuit 17 has signal J of NOR circuit 16, respectively, as inputs. The other input to each of NAND circuits 17 and 18 is $\bar{S}$, a bi-level "Set" signal conducted over conductor 23, serving as a state-forcing signal. Output signal D from NOR circuit 15 is conducted over conductor 26 and serves as an input to AND circuit 13. The output signal C from NAND circuit 17 serves as a second input to AND circuit 11 via conductor 20. Signal E from NAND circuit 18 serves as the second input to AND circuit 12 via conductor 25 and as the second input to AND circuit 14 via conductor 27.

The Boolean equations describing the circuit of FIG. 1 are as follows:

$$C = S + BC + AE \quad (1)$$

$$D = \overline{BC + AE} \quad (2)$$

$$E = S + BD + AE \quad (3)$$

$$J = \overline{AE + BD} \quad (4)$$

Figure 5:
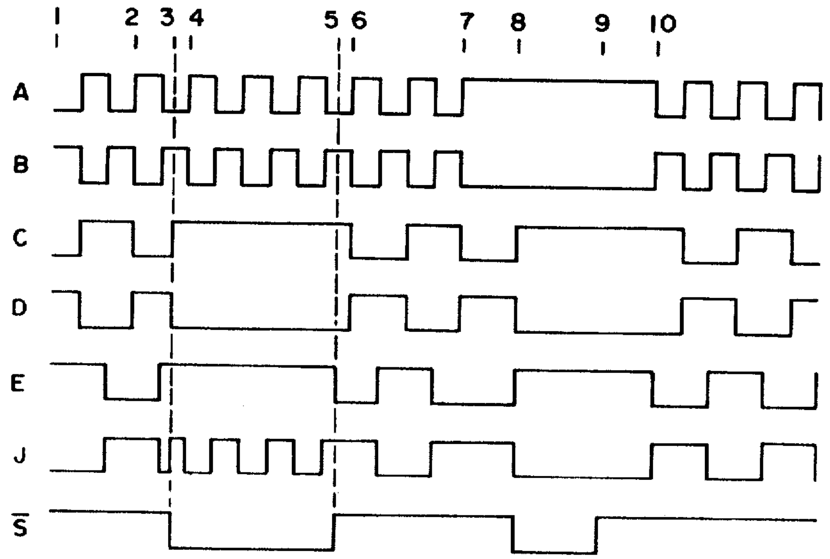
FIG. 5 illustrates typical waveforms at points designated in FIG. 1.
Figure 6:
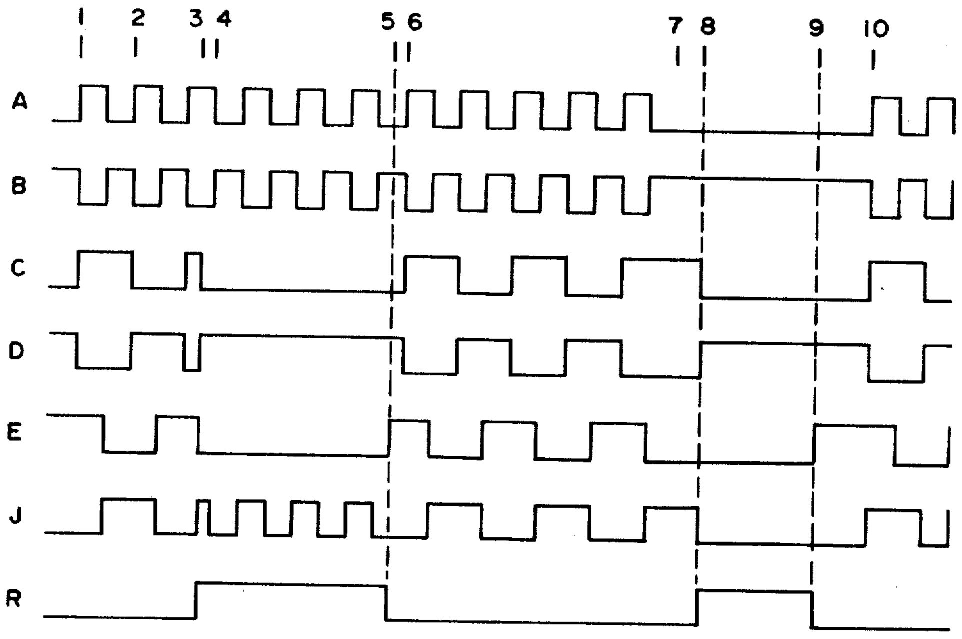
FIG. 6 illustrates typical waveforms at points designated in FIG. 2.

These equations accurately describe the circuit and are useful in the development of the idealized wave shapes of FIG. 5 and FIG. 6.

Figure 2:
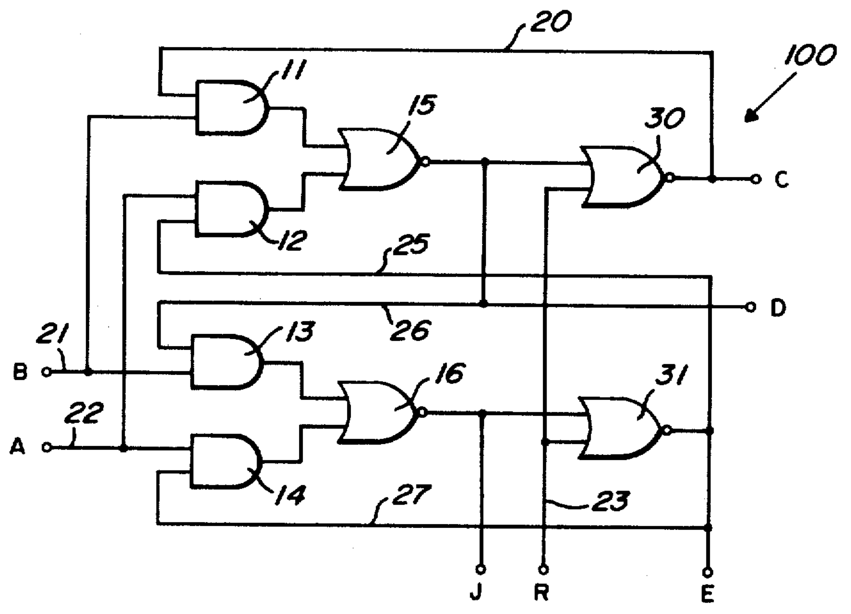
FIG. 2 is a logic diagram for a resettable binary flip-flop.

FIG. 2 is a logic diagram that is exactly the same as that of FIG. 1 except that NOR circuit 30 replaces NAND circuit 17 of FIG. 1, NOR circuit 31 replaces NAND circuit 18 of FIG. 1 and bi-level "Reset" signal R; the other state-forcing signal replaces bi-level "Set" signal $\overline{S}$. This simple substitution yields the following Boolean equations defining the circuit:

$$C = \overline{R}\,(AE + BC) \quad (5)$$

$$E = \overline{R}\,(AE + BD) \quad (6)$$

Equations 2 and 4, of course, also apply.

Figure 3:
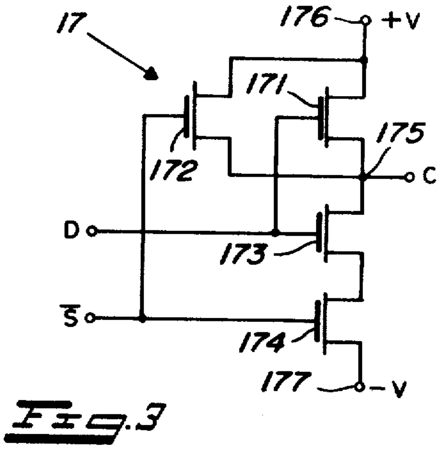
FIG. 3 is a representative schematic diagram of one of the two output NAND circuits of FIG. 1.

FIG. 3 is a schematic diagram of the detail of NAND circuit 17 of FIG. 1. A P-channel insulated gate field effect transistor (IGFET) 171 is shown with its source connected to a relatively positive voltage supply at terminal 176, its drain connected to junction 175 and its gate connected to receive output signal D. A second P-channel IGFET 172 is shown with its source connected to terminal 176, its drain connected to junction 175 and its gate connected to receive "Set" signal $\overline{S}$. N-channel IGFET 173 has its source connected to the drain of N-channel IGFET 174, its drain connected to junction 175 and its gate connected to receive output signal D. N-channel IGFET 174 has its source connected to a voltage supply at terminal 177, negative with respect to the voltage supply at terminal 176, the gate of IGFET 174 being connected to receive the signal $\overline{S}$.

NAND circuit 18 is identical in schematic detail to NAND circuit 17 except that signal J replaces output signal D.

Figure 4:
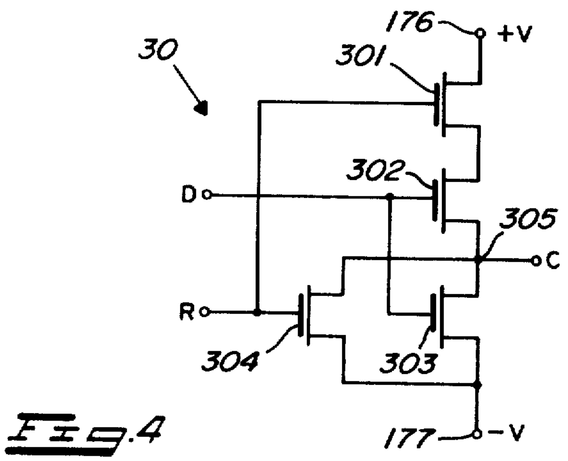
FIG. 4 is a representative schematic drawing of one of the output NOR circuits of FIG. 2.

FIG. 4 schematically illustrates the details of NOR circuit 30 of FIG. 2. P-channel IGFET 301 has its source connected to terminal 176, its drain connected to the source of P-channel IGFET 302, and its gate connected to receive "Reset" signal R. IGFET 302 has its drain connected to junction 305 and its gate connected to receive output signal D. N-channel IGFET 303 has its source connected to terminal 177, its drain connected to junction 305, and its gate connected to receive output signal D. N-channel IGFET 304 has its source connected to terminal 177, its drain connected to junction 305 and its gate connected to receive "Reset" signal R.

NOR circuit 31 is exactly the same in schematic detail as NOR circuit 30 except that signal J replaces output signal D.

Those skilled in the art realize that the IGFETs shown in this preferred embodiment can be complementary MOS circuits. They also realize that the circuits can be comprised of single channel devices with loads, appropriately connected, replacing complementary devices.

MODE OF OPERATION

Reference should now be made to FIG. 5 in conjunction with FIG. 1. The interval between times 1 and 2 of FIG. 5 illustrate ordinary operation of the flip-flop. This interval makes it evident that output signals C and D are complementary and result from complementary input signals A and B, but are at one-half the frequency of signals A and B. Ordinary operation continues until time 3 at which time, for illustrative purposes, assume that $\overline{S}$ goes from a "1" to a "," as shown, and output signal C goes from a "0" to a "1" as a result of the change in $\overline{S}$, in accordance with Boolean Equation (1) above. Signal E is shown as locked in the "1" state, as expected from Equation (3) above. Output signal D immediately goes to a "0," as the complement of output signal C. Signal J immediately goes to a "1." At time 4, J goes to a "0." From time 4 to time 5, more than one cycle is illustrated with $\overline{S}$ going to a "1" at time 5. Signal E merely goes to "0" and signal C follows at time 6. Signal D at time 6 goes to a "1." Normal operation continues.

At time 7, input signal A remains a "1" and input signal B remains at "0." At time 8, "Set" signal $\overline{S}$ goes to "0" causing output signal C and signal E to go to "1." Also, at time 8, output signal D and signal J go to "0" in accordance with Boolean Equations (2) and (4) respectively. The flip-flop remains in the "Set" state and "Set" signal $\overline{S}$ goes to "1" at time 9 with no other change in the idealized waveforms.

At time 10, normal operation is resumed with input signal A going to "0" and input signal B going to "1." Normal operation is then continued.

FIG. 6 illustrates the operation of the logic diagram of FIG. 2. The interval between times 1 and 2 illustrates ordinary operation of the flip-flop. This ordinary operation continues until time 3 when Reset signal R goes from "0" to "1" causing output signal C and signal E, respectively, to go from "1" to "0," evident from Equations (5) and (6) above. Output signal D and signal J each go from "0" to "1" as expected from Equations (2) and (4) above. Signal J goes to a "0" at time 4. From time 4 to time 5 is a showing of more than a complete cycle of operation with R equal to "1." Then at time 5, R goes to a "0" causing E to go to a "1." At time 6, C goes to a "1" and D goes to a "0" with normal operation then continuing until time 7 at which time, for illustrative purposes, assume that signal A remains a "0" and signal B remains a "1," as shown. Output signal C remains a "1" and output signal D remains a "0". In normal operation, this could happen for a number of reasons. For example, if this flip-flop were used in an electronic timepiece, this condition might have happened, or the reverse thereof, or at any other time during the cycle, with an unknown state reached by the flip-flop. It is often desirable in frequency dividing circuits to start from a known state. FIG. 6 illustrates the action of resetting the flip-flop by introducing "Reset" signal R at time 8.

As soon as signal R goes to "1," signal C goes to "0," as illustrated in Boolean Equation (5) above. Output signal D goes to "1" in accordance with Boolean Equation (2). Signal J goes to "0" in accordance with Equation (4). The flip-flop remains stable with output signal C a "0" and output signal D a "1," indicating a reset condition. Then at time 9, "Reset" signal R goes to "0" causing output signal E to go to "1" in accordance with Equation (6). The flip-flop remains in the "Reset" state until time 10 when input signal A goes to "1" and input signal B goes to "0." Normal operation is then resumed.

Two examples of using the "Reset" signal R have been given, and two examples of using the "Set" signal S have been given. It should be realized that the "Set" and "Reset" signals could have been introduced at any time and with the inputs reversed from those in the examples starting at time 7. Those skilled in the art are readily able to determine through the logic diagrams and Boolean expressions given that the flip-flop is capable of being set or reset under any conditions. Also, those skilled in the art realize that the Boolean expressions are capable of implementation in many ways, but the spirit and scope of this invention contemplate those variations.

What is claimed is:

1. A bi-stable flip-flop frequency dividing circuit comprised of field effect transistors logically wired to form a first and a second AND-NOR circuit, for providing a bi-level output signal D and a bi-level signal J, respectively, means for connecting output signal D as an input to the second AND-NOR circuit, each of the AND-NOR circuits including input terminal means for receiving bi-level complementary input signals A and B, the dividing circuit providing bi-level output signal C and bi-level signal E, respectively, all of the bi-level signals being designated a binary "1" at one level, and a binary "0" at the other level, the improvement comprising:

a. means for receiving a bi-level state-forcing signal having a binary value of "0" or "1;"

b. first gating means, operatively connected to the output of the first AND-NOR circuit and to the receiving means, responsive to output signal D and to the state-forcing signal for providing a prescribed binary value of output signal C when the state-forcing signal is of a predetermined binary value, signal C serving also as an input signal to the first AND-NOR circuit; and c. second gating means, operatively connected to the output of the second AND-NOR circuit and to the receiving means, responsive to signal J and to the state-forcing signal for providing a prescribed binary value of signal E when the state-forcing signal is of a predetermined binary value, signal E also serving as an input to each of the AND-NOR circuits.

2. The dividing circuit of claim 1 wherein all of the circuits are comprised of complementary field effect transistors.

3. The dividing circuit of claim 2 wherein the complementary field effect transistors are complementary insulated-gate field effect transistors.

4. A bi-stable flip-flop frequency dividing circuit comprised of field effect transistors logically wired to form a first and a second AND-NOR circuit, for providing a bi-level output signal D and a bi-level signal J, respectively, means for connecting output D as an input to the second AND-NOR circuit, each of the AND-NOR circuits including input terminal means for receiving bi-level complementary input signals A and B, the dividing circuit providing bi-level output signal C, the complement of output signal D, and bi-level signal E, respectively, all of the bi-level signals being designated a binary "1" at one level and a binary "0" at the other level, the improvement comprising:

a. means for receiving a bi-level reset signal R having a binary value of "0" or "1;"

b. first gating means, operatively connected to the output of the first AND-NOR circuit and to the receiving means, responsive to output D and to reset signal R for causing output signal C to equal a "0" whenever reset signal R is "1," signal C serving as an input signal to the first AND-NOR circuit; and c. second gating means, operatively connected to the output of the second AND-NOR circuit and to the receiving means, responsive to signal J and to reset signal R for causing signal E to equal "0" whenever reset signal R is a "1," signal E also serving as an input to each of the AND-NOR circuits.

5. The dividing circuit of claim 4 wherein the first and second gating means further comprise a first and second NOR circuit, respectively.

6. The dividing circuit of claim 5 wherein the circuit is comprised of complementary field effect transistors.

7. The dividing circuit of claim 6 wherein the complementary field effect transistors are complementary insulated gate field effect transistors.

8. The dividing circuit of claim 7 wherein the circuit is arranged to conform to the following Boolean relationships:

$$C = \overline{R}\,(AE + BC)$$

$$D = \overline{AE + BC}$$

$$E = \overline{R}\,(AE + BD)$$

$$J = \overline{AE + BD}$$

9. The dividing circuit of claim 8, the first NOR circuit further comprising:

b. i. first and second P-channel insulated gate field effect transistors, the first P-channel transistor having its source connected to a first voltage source, its drain connected to the source of the second P-channel transistor and its gate connected to the receiving means, the second P-channel transistor having its drain connected to a first junction and its gate connected to receive output signal D; and ii. first and second N-channel insulated gate field effect transistors, the first N-channel transistor having its source connected to a second voltage source, less positive than the first voltage source, its gate connected to the receiving means and its drain connected to the first junction, the first junction serving as the point at which output C is provided, the second N-channel transistor having its source connected to the second voltage source, its drain connected to the first junction and its gate connected to receive output signal D.

10. The dividing circuit of claim 9 wherein the second NOR circuit further comprises:

c. i. third and fourth P-channel insulated gate field effect transistors, the third P-channel transistor having its source connected to the first voltage source, its drain connected to the source of the fourth P-channel transistor and its gate connected to the receiving means, the fourth P-channel transistor having its drain connected to a second junction and its gate connected to receive signal J; and ii. third and fourth N-channel insulated gate field effect transistors, the third N-channel transistor having its source connected to the second voltage source, its drain connected to the second junction, the second junction serving as the point where signal E is provided, and its gate connected to the receiving means, the fourth N-channel transistor having its source connected to the second voltage source, its drain connected to the second junction and its gate connected to receive signal J.

11. A bi-stable flip-flop frequency dividing circuit comprised of field effect transistors logically wired to form a first and a second AND-NOR circuit, for providing a bi-level output signal D and a bi-level signal J, respectively, means for connecting output signal D as an input to the second AND-NOR circuit, each of the AND-NOR circuits including input terminal means for receiving bi-level complementary input signals A and B, the dividing circuit providing bi-level output signal C, the complement of output signal D, and bi-level signal E, respectively, all of the bi-level signals being designated a binary "1" at one level and a binary "0" at the other level, the improvement comprising:

a. means for receiving a bi-level set signal $\overline{S}$ having a binary value of "0" or "1";

b. first gating means, operatively connected to the output of the first AND-NOR circuit and to the receiving means, responsive to output D and to set signal $\overline{S}$ for causing output signal C to equal "1" whenever set signal $\overline{S}$ is a binary "0," signal C serving also as an input to the first AND-NOR circuit; and c. second gating means, operatively connected to the output of the second AND-NOR circuit and to the receiving means, responsive to signal J and to set signal $\overline{S}$ for causing signal E to equal "1" whenever set signal $\overline{S}$ is a "0," signal E also serving as an input to each of the AND-NOR circuits.

12. The dividing circuit of claim 11 wherein the circuit is arranged to conform to the following Boolean relationships:

$$C = S + BC + AE$$

$$D = \overline{BC + AE}$$

$$E = S + BD + AE$$

$$J = \overline{AE + BD}$$

13. The dividing circuit of claim 11 wherein the first and second gating means further comprise first and second NAND circuit respectively.

14. The dividing circuit of claim 13 wherein the circuit is comprised of complementary field effect transistors.

15. The dividing circuit of claim 14 wherein the complementary field effect transistors are complementary insulated gate field effect transistors.

16. The dividing circuit of claim 15 wherein the first NAND circuit further comprises:

b. i. first and second P-channel insulated gate field effect transistors, the first P-channel transistor having its source connected to a first voltage source, its drain connected to a first junction and its gate connected to receive output D, the second P-channel transistor having its source connected to the first voltage source, its drain connected to the first junction and its gate connected to the receiving means; and ii. first and second N-channel insulated gate field effect transistors, the first N-channel transistor having its source connected to the drain of the second N-channel transistor, its drain connected to the first junction, the first junction being the point at which output C is provided, and having its gate connected to receive output D, the second N-channel transistor having its source connected to a second voltage source less positive than the first voltage source and its gate connected to the receiving means.

17. The dividing circuit of claim 16 wherein the second NAND circuit further comprises:

c. i. third and fourth P-channel insulated gate field effect transistors, the third P-channel transistor having its source connected to the first voltage source, its drain connected to a second junction and its gate connected to receive signal J, and the fourth P-channel transistor having its source connected to the first voltage source, its drain connected to the second junction and its gate connected to the receiving means; and ii. third and fourth N-channel insulated gate field effect transistors, the third N-channel transistor having its source connected to the drain of the fourth N-channel transistor, its drain connected to the second junction, the second junction being the point where signal E is provided, and having its gate connected to receive signal J, the fourth N-channel transistor having its source connected to the second voltage source and its gate connected to the receiving means.

* * * * *